United States Patent
Ketels et al.

(10) Patent No.: US 10,710,479 B2
(45) Date of Patent: Jul. 14, 2020

(54) OCCUPANT COMFORT SYSTEM

(71) Applicant: Faurecia Automotive Seating, LLC, Auburn Hills, MI (US)

(72) Inventors: Cedric Ketels, Holland, MI (US); Rod Goodrich, Watervliet, MI (US); Matthew K. Benson, Holland, MI (US); Alfred H. Bransdorfer, Holland, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 245 days.

(21) Appl. No.: 15/846,342

(22) Filed: Dec. 19, 2017

(65) Prior Publication Data
US 2019/0184867 A1 Jun. 20, 2019

(51) Int. Cl.
*B60N 2/50* (2006.01)
*B60N 2/52* (2006.01)
*B60N 2/02* (2006.01)
*B60N 2/14* (2006.01)

(52) U.S. Cl.
CPC ........... *B60N 2/501* (2013.01); *B60N 2/0244* (2013.01); *B60N 2/14* (2013.01); *B60N 2/502* (2013.01); *B60N 2/525* (2013.01); *B60N 2002/0212* (2013.01); *B60N 2002/0268* (2013.01)

(58) Field of Classification Search
CPC ........ B60N 2/501; B60N 2/0244; B60N 2/14; B60N 2/502; B60N 2/525
See application file for complete search history.

(56) References Cited

U.S. PATENT DOCUMENTS

| 3,144,695 A | 8/1964 | Budwig |
| 3,341,903 A | 9/1967 | Buntic |
| 3,632,076 A | 1/1972 | Rogers, Jr. |
| 4,324,414 A | 4/1982 | Wilkes |
| 4,432,525 A | 2/1984 | Duvall |
| 4,500,062 A | 2/1985 | Sandvik |
| 4,515,337 A | 5/1985 | Torras |
| 4,685,730 A | 8/1987 | Linguanotto |
| 4,727,629 A | 3/1988 | Hoen |
| 4,869,554 A | 9/1989 | Abu-Isa |
| 4,883,320 A | 11/1989 | Izumida |
| 5,013,086 A | 5/1991 | Benzur |

(Continued)

FOREIGN PATENT DOCUMENTS

| CA | 2125642 | 12/1994 |
| CN | 1618654 | 5/2005 |

(Continued)

OTHER PUBLICATIONS

German Office Action for German App. No. 10 2016 123 681.0 dated Oct. 19, 2017, 601-666 DE, 5 pages, (no English translation available).

(Continued)

*Primary Examiner* — Michael D Lang
(74) *Attorney, Agent, or Firm* — Barnes & Thornburg LLP (57) ABSTRACT

An occupant support includes a seat coupled to a seat base. The seat includes a seat bottom and a seat back. The seat back is coupled to the seat bottom to extend upwardly away from the seat bottom. Motion-sickness mitigation means facilitates relative movement between a support surface of the seat and the seat base.

18 Claims, 6 Drawing Sheets

(56) References Cited

U.S. PATENT DOCUMENTS

| | | |
|---|---|---|
| 5,368,118 A | 11/1994 | Hoefle |
| 5,393,126 A | 2/1995 | Boulva |
| 5,558,399 A | 9/1996 | Serber |
| 5,582,381 A | 12/1996 | Graf |
| 5,769,490 A | 6/1998 | Falzon |
| 5,921,605 A | 7/1999 | Musukula |
| 5,976,097 A | 11/1999 | Jensen |
| 5,992,933 A | 11/1999 | West |
| 6,068,280 A | 5/2000 | Torres |
| 6,793,289 B2 | 9/2004 | Kuster |
| 6,814,407 B2 | 11/2004 | Mundell |
| 7,044,553 B2 | 5/2006 | Ropp |
| 7,063,386 B2 | 6/2006 | Dowty |
| 7,083,233 B2 | 8/2006 | Massara |
| 7,281,749 B2 | 10/2007 | Yamada |
| 7,334,758 B2 | 2/2008 | Williamson |
| 7,338,126 B2 | 3/2008 | Ropp |
| 7,481,493 B2 | 1/2009 | Fujita |
| 7,490,572 B2 | 2/2009 | Grober |
| 7,506,910 B2 | 3/2009 | Leitner |
| 7,517,024 B2 | 4/2009 | Cvek |
| 7,575,206 B2 | 8/2009 | Meier |
| 7,722,526 B2 | 5/2010 | Kim |
| 7,731,294 B2 | 6/2010 | Yasuda |
| 7,841,662 B2 | 11/2010 | Samain |
| 7,971,939 B2 | 7/2011 | Fujita |
| 8,020,933 B2 | 9/2011 | Kim |
| 8,100,471 B2 | 1/2012 | Lawall |
| 8,340,869 B2 | 12/2012 | Wakita |
| 8,662,585 B2 | 3/2014 | Garvis |
| 8,684,460 B2 | 4/2014 | Weir, III |
| 8,690,750 B2 | 4/2014 | Krueger |
| 8,840,186 B2 | 9/2014 | Samain |
| 8,911,015 B2 | 12/2014 | Cohen |
| 9,045,058 B2 | 6/2015 | Katoh |
| 9,193,280 B2 | 11/2015 | McMillen |
| 9,193,287 B2 | 11/2015 | McMillen |
| 9,242,581 B2 | 1/2016 | Farooq |
| 9,272,643 B2 | 3/2016 | Nagayasu |
| 9,428,083 B2 | 8/2016 | Lehner |
| 9,494,940 B1 | 11/2016 | Kentley |
| 9,517,777 B2 | 12/2016 | Hall |
| 9,550,440 B2 | 1/2017 | Nagayasu |
| 9,561,741 B2 | 2/2017 | Nagayasu |
| 9,604,560 B1 | 3/2017 | Ellis |
| 9,682,682 B2 | 6/2017 | Aoki |
| 9,713,380 B2 | 7/2017 | Gehner |
| 9,751,434 B2 | 9/2017 | Sugiyama |
| 9,802,513 B2 | 10/2017 | Katoh |
| 9,950,646 B2 | 4/2018 | Katoh |
| 9,975,458 B2 | 5/2018 | Takeuchi |
| 2001/0029621 A1 | 10/2001 | Howland |
| 2002/0135214 A1 | 9/2002 | Ursel |
| 2003/0116999 A1 | 6/2003 | Fujita |
| 2004/0245824 A1 | 12/2004 | McMillen |
| 2005/0179294 A1 | 8/2005 | Dowty |
| 2006/0055214 A1 | 3/2006 | Serber |
| 2006/0138831 A1 | 6/2006 | McMillen |
| 2006/0191114 A1 | 8/2006 | Yu |
| 2007/0080013 A1 | 4/2007 | Melz |
| 2008/0023995 A1 | 1/2008 | Ott |
| 2009/0115234 A1 | 5/2009 | Samain |
| 2009/0188698 A1 | 7/2009 | Cloutier |
| 2010/0050923 A1 | 3/2010 | Lemons |
| 2010/0268133 A1 | 10/2010 | Samain |
| 2011/0099773 A1 | 5/2011 | Golden |
| 2013/0006478 A1* | 1/2013 | Lin .......................... B60N 2/10 701/49 |
| 2013/0175838 A1 | 7/2013 | Oshima |
| 2015/0105641 A1 | 4/2015 | Austin |
| 2015/0266448 A1 | 9/2015 | Aoki |
| 2015/0343924 A1 | 12/2015 | Takeuchi |
| 2016/0096450 A1 | 4/2016 | Kondrad |
| 2016/0159254 A1 | 6/2016 | Katoh |
| 2016/0243967 A1 | 8/2016 | Seibold |
| 2017/0129373 A1 | 5/2017 | Knox |
| 2017/0253254 A1 | 9/2017 | Sweeney |
| 2018/0222518 A1 | 8/2018 | Hill |

FOREIGN PATENT DOCUMENTS

| | | |
|---|---|---|
| CN | 101274604 | 10/2008 |
| CN | 104758153 | 7/2015 |
| DE | 10041910 | 1/2002 |
| DE | 102004058503 | 1/2006 |
| DE | 102009048902 | 4/2011 |
| DE | 102011109470 | 2/2012 |
| DE | 102011009211 A1 | 7/2012 |
| DE | 102015117980 | 5/2016 |
| EP | 0185388 A1 | 6/1986 |
| EP | 1193117 | 4/2002 |
| EP | 1663727 | 6/2006 |
| FR | 2061931 | 6/1971 |
| FR | 2776583 | 10/1999 |
| GB | 1330683 A | 9/1973 |
| GB | 8816607 | 8/1988 |
| GB | 2206787 | 1/1989 |
| GB | 2206787 B | 1/1989 |
| GB | 2407028 | 4/2005 |
| GB | 201307595 | 6/2013 |
| JP | 2002102006 | 4/2002 |
| JP | 2003299231 A | 10/2003 |
| WO | 2004026080 | 4/2004 |
| WO | 2005025945 | 3/2005 |
| WO | 2005037020 | 4/2005 |
| WO | 2005094632 | 10/2005 |
| WO | 2006083158 | 8/2006 |
| WO | 2006095455 A1 | 9/2006 |
| WO | 2016197068 | 12/2016 |

OTHER PUBLICATIONS

Office Action dated Apr. 19, 2019 for U.S. Appl. No. 15/852,010, 4552 US-U II, pp. 1-6.

Extended European Search Report for European App. No. 17206306.7 dated May 14, 2018, 4175 EP II, 5 pages.

Office Action dated Feb. 15, 2019 for U.S. Appl. No. 15/856,341 (pp. 1-10).

Office Action dated Mar. 27, 2020, for U.S. Appl. No. 15/836,001, (pp. 1-15).

* cited by examiner

OCCUPANT COMFORT SYSTEM

BACKGROUND

The present disclosure relates to occupant supports, and particularly to occupant supports configured for use in vehicles. More particularly, the present disclosure relates to occupant supports configured to move relative to a vehicle.

SUMMARY

According to the present disclosure, a vehicle includes an occupant support mounted to a floor of the vehicle. The occupant support includes a seat base coupled with the vehicle for movement with the vehicle and a seat coupled to the seat base. The seat is adapted to support an occupant of the occupant support on a support surface above the floor of the vehicle.

In illustrative embodiments, the occupant support further includes means for facilitating relative movement between the support surface of the seat and the seat base in response to an acceleration of the seat base to reduce acceleration of the occupant during acceleration of the seat base so that motion sickness experienced by the occupant may be mitigated, remedied, or minimized. The means is configured to reduce the magnitude of at least one of a lateral acceleration and a fore-and-aft acceleration of the occupant during the acceleration of the seat base.

In illustrative embodiments, the means includes a plurality of actuators and a controller. The actuators are coupled with the seat and the seat base. The controller is configured to control movement of each of the plurality of actuators individually to cause the plurality of actuators to move the seat relative to the seat base in response to the acceleration of the seat base. In illustrative embodiments, the controller is configured to translate and tilt the seat relative to the seat base in response to the seat base accelerating.

In illustrative embodiments, the seat includes a left lateral side, a right lateral side, a fore end, and an aft end. The controller is configured to cause the plurality of actuators to raise the left lateral side and lower the right lateral side of the seat in response to the vehicle experiencing a right turn. The controller is configured to cause the plurality of actuators to translate the seat in the aft direction in response to the vehicle accelerating in the forward direction.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Occupant supports 10, 210, 310, 410, 510 adapted for use in a vehicle 11 are shown in FIGS. 1, 8, 9, 10, and 11. Occupant supports 10, 210, 310, 410, 510 are configured to mitigate, eliminate, or minimize motion sickness of an occupant supported by the occupant support 10, 210, 310, 410, 510 by reducing acceleration forces experienced by the occupant due to vehicle acceleration in the fore-and-aft and lateral axes.

Figures 2, 3:
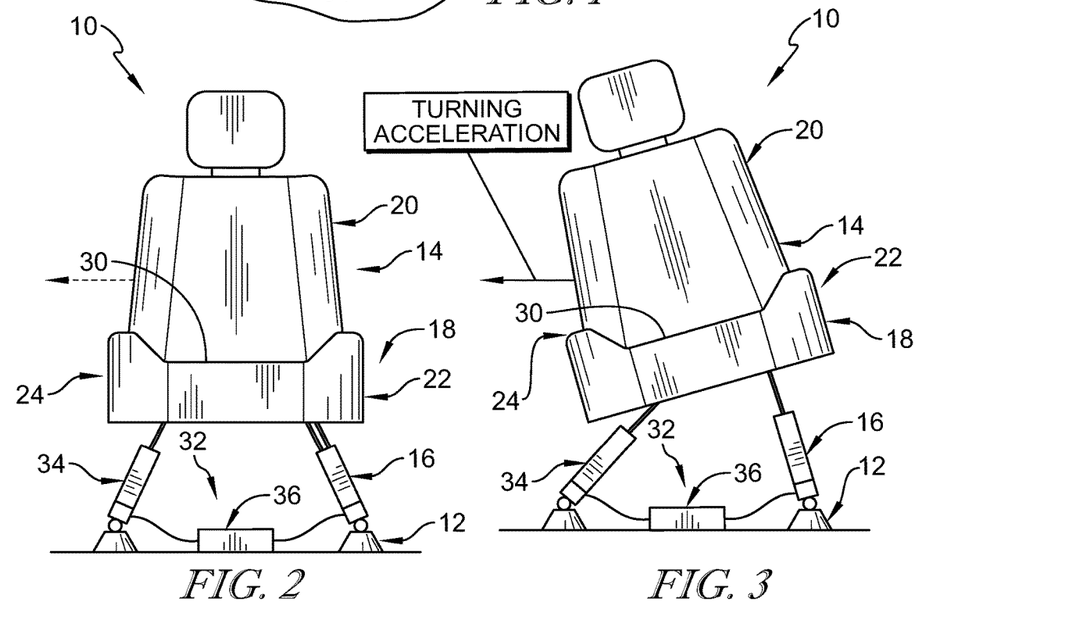
FIG. 2 is a diagrammatic view of the occupant support of FIG. 1 showing that the seat is upright and that the seat base is not experiencing an acceleration.
FIG. 3 is a diagrammatic view of the occupant support of FIG. 1 suggesting that the occupant support is experiencing a right-turn acceleration and showing that the motion-sickness mitigation means has moved the seat relative to the seat base so that the seat is tilted in response to the acceleration being applied to the occupant support.

Occupant supports 10, 210, 310, 410, 510 allow the occupant to move slightly laterally and fore and aft to more closely match the motion of the vehicle as suggested in FIGS. 2 and 3 instead of remaining relatively static. As a result, the acceleration forces experienced by the occupant are reduced. This may also be referred to as G-force dampening. Motion sickness may result from a discrepancy between what an occupant's eyes perceive compared to what the occupant's body experiences (biological accelerometers: vestibular system, somatic, visceral).

Occupant support 10 includes a seat base 12, a seat 14, and motion-sickness mitigation means 16 as shown in FIGS. 1-3 and 6. Seat base 12 is adapted to couple with a vehicle 11 for movement with vehicle 11. Seat 14 is coupled with seat base 12 for movement with seat base 12. Motion-sickness mitigation means 16 facilitates relative movement between seat base 12 and a support surface 30 of seat 14 in response to an acceleration of seat base 12 to reduce at least one of lateral acceleration and fore and aft acceleration of the occupant during acceleration of seat base 12 so that motion sickness experienced by the occupant is minimized as suggested in FIGS. 2 and 3.

Figure 1:
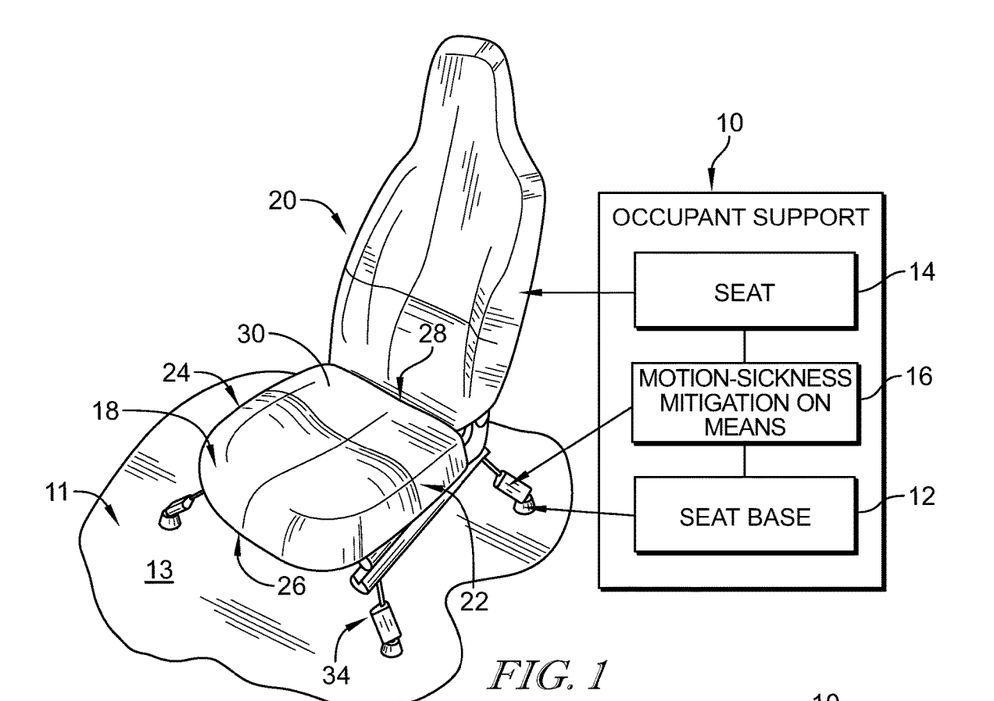
FIG. 1 is a perspective and diagrammatic view of an occupant support adapted for use in a passenger vehicle showing that the occupant support includes a seat base, a seat, and motion-sickness mitigation means coupled with the seat base and the seat, the motion-sickness mitigation means includes a plurality of actuators configured to move the seat relative to the seat base in response to an acceleration of the seat base to minimize motion sickness of the occupant.

Seat base 12 is configured to couple occupant support 10 with vehicle 11 as suggested in FIG. 1. In the illustrative embodiment, seat base 12 includes a plurality of mounting pads as shown in FIG. 1. In other embodiments, seat base 12 includes a rail system. Seat base 12 is coupled to a floor 13 of vehicle 11 in the illustrative embodiment. In other embodiments, seat base 12 is coupled to a frame arranged to extend around seat 14 as suggested in FIG. 10. Seat base 12 moves with vehicle 11 such that acceleration of vehicle 11 is applied to seat base 12.

Seat 14 includes a seat bottom 18 and a seat back 20 as shown in FIGS. 1-3. Seat bottom 18 is adapted to support thighs of the occupant and seat back 20 is adapted to support a back and shoulders of the occupant. Seat bottom 18 includes a left lateral side 22, a right lateral side 24 spaced apart from left lateral side 22, a fore end 26, and an aft end 28 spaced apart from fore end 26. Seat back 20 is arranged to extend upwardly and away from aft end 28 of seat bottom 18.

Seat bottom 18 and seat back 20 cooperate to define support surface 30 adapted to support the occupant of occupant support 10 thereon as shown in FIG. 1. Support surface 30 is defined by a trim of seat 14 in the illustrative embodiment. Support surface 30 is configured to move relative to seat base 12 to mitigate motion sickness. Support surface 30 may move relative to seat base 12 due to movement of seat bottom 12. Support surface 30 may move relative to seat base 12 in response to movement of support surface 30 relative to seat bottom 18, for example, due to an adjustable seat cushion.

Motion-sickness mitigation means 16 couples seat bottom 18 with seat back 20 so that seat 14 moves with seat base 12 and vehicle 11 as suggested in FIG. 1. Motion-sickness mitigation means 16 facilitates relative movement between support surface 30 of seat 14 and seat base 12 in response to an acceleration of seat base 12 to reduce at least one of lateral acceleration and fore-and-aft acceleration of the occupant during acceleration of seat base 12 so that motion sickness experienced by the occupant is minimized. In some embodiments, motion-sickness mitigation means 16 reduces vibrations of about 0.2 to about 0.4 Hertz. In some embodiments, motion-sickness mitigation means 16 reduces accelerations of about 0.1 to about 0.5 Hertz.

Motion-sickness mitigation means 16 includes a motion-sickness mitigation system 32 that includes a plurality of actuators 34 and a controller 36 as shown in FIGS. 2 and 3. The plurality of actuators 34 are coupled with seat bottom 18 and seat base 12. Controller 36 is configured to control movement of each of the plurality of actuators 34 individually to cause the plurality of actuators 34 to move seat 14 relative to the seat base 12. Actuators 34 may comprise air cylinders or air springs.

Figure 4:
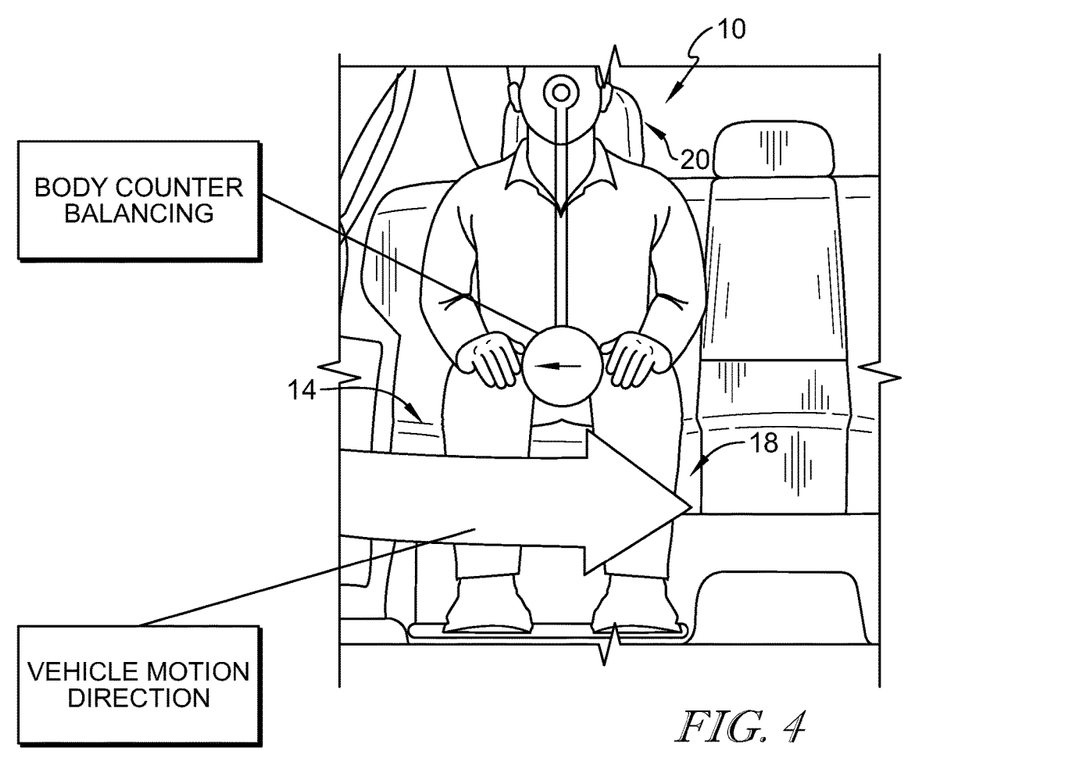
FIG. 4 is a diagrammatic view of an occupant supported by the occupant support suggesting that the occupant's body experiences inertia against an acceleration caused by the vehicle making a turn.
Figure 4A:
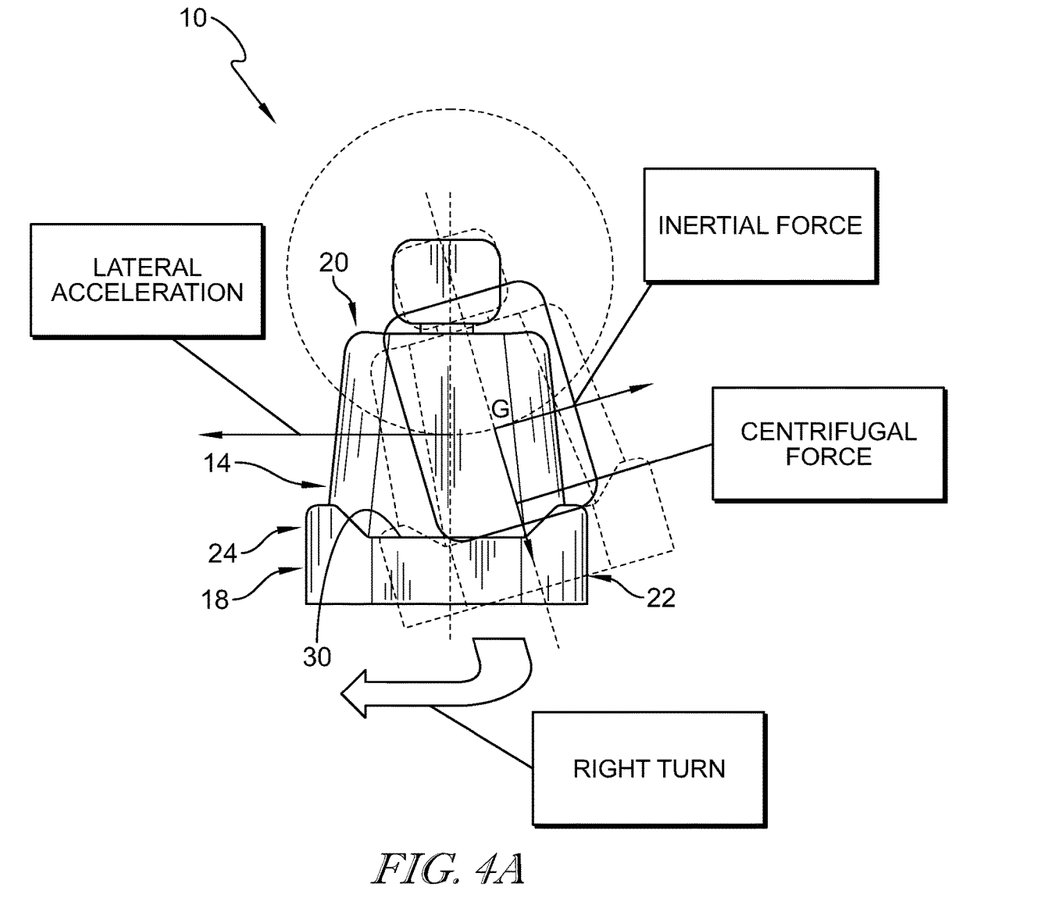
FIG. 4A is a diagrammatic view of the occupant supported suggesting that the occupant's body experiences inertia against an acceleration caused by the vehicle making a turn.
Figure 5:
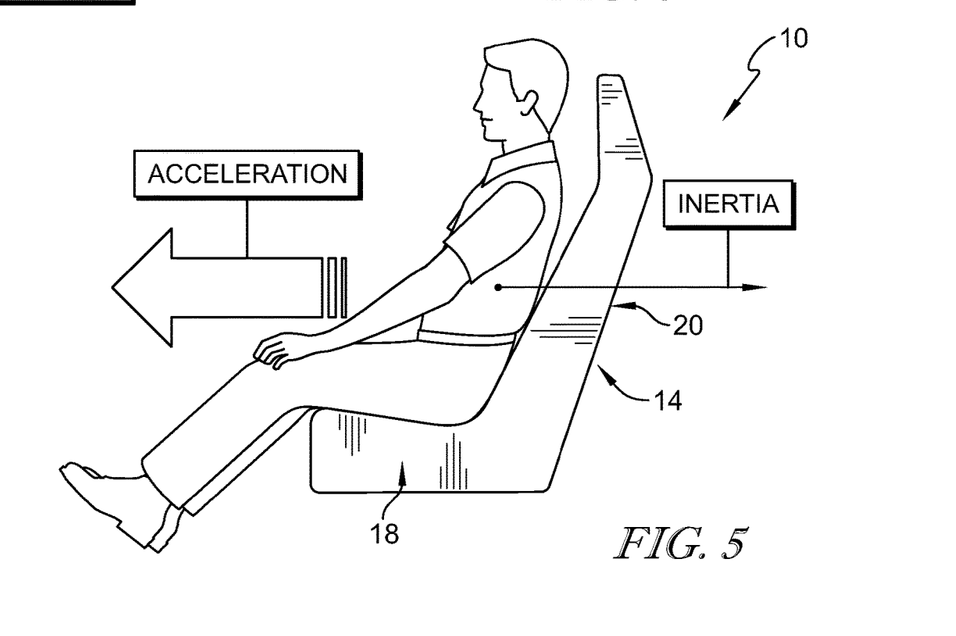
FIG. 5 is a diagrammatic view of an occupant supported by the occupant support suggesting that the occupant's body experiences inertia force against a forward acceleration of the occupant support.

Acceleration of vehicle 11 is applied to the occupant through occupant support 10 as suggested in FIGS. 4, 5, and 4A. During a vehicle acceleration event, the momentum of the occupant resists the acceleration. This may cause the occupant to feel a pressure of their body acting against seat 14. The motion-sickness mitigation means 16 of the present disclosure allows pendulum like movement of support surface 30 and the occupant relative to seat base 12 and floor 13 to reduce the magnitude of the acceleration felt by the occupant.

The acceleration may be a lateral acceleration in response to a right turn as suggested in FIG. 4A. The motion-sickness mitigation means 16 allows pendulum like movement of support surface 30 such that the centrifugal force is parallel with the body and angled relative to vertical. The inertial force is perpendicular to the centrifugal force and extends away from the lateral acceleration.

Motion-sickness mitigation means 16 of the present disclosure allows movement of support surface 30 and the occupant relative to seat base 12 and floor 13 to extend the time that force is applied to the occupant to reduce the magnitude of the acceleration felt by the occupant. The movement of support surface 30 may allow forces to be applied downwardly through occupant's thighs and into seat bottom 18 and through the occupant's feet into floor 13 as compared to the forces being applied laterally and being resisted by the abdomen and core of the occupant.

The plurality of actuators 34 are configured to translate and tilt seat bottom 18 relative to seat base 12 as suggested in FIGS. 2 and 3. Controller 36 is configured to cause the plurality of actuators 34 to raise left lateral side 22 and lower right lateral side 24 of seat bottom 18 in response to seat base 12 experiencing a right turn. For example, seat base 12 experiences a right turn when vehicle 11 is making a right turn. The plurality of actuators 34 tilt seat bottom 18 toward the right and translates seat bottom 18 toward the left in response to seat base 12 experiencing a right turn.

Controller 36 is configured to cause the plurality of actuators 34 to raise right lateral side 24 and lower left lateral side 22 of seat bottom 18 in response to seat base 12 experiencing a left turn. The plurality of actuators 34 tilt seat bottom 18 toward the left and translates seat bottom 18 toward the right in response to seat base 12 experiencing a right turn.

Controller 36 is configured to cause the plurality of actuators 34 to translate seat bottom 18 aft relative to seat base 12 in response to seat base 12 experiencing a forward acceleration. Controller 36 may be configured to cause the plurality of actuators 34 to tilt the fore end of support surface 30 down and the aft end of support surface 30 up relative to seat base 12 in response to seat base 12 experiencing a forward acceleration.

Controller 36 is configured to cause the plurality of actuators 34 to translate seat bottom 18 forward relative to seat base 12 in response to seat base 12 experiencing a rearward acceleration. Controller 36 is configured to cause the plurality of actuators 34 to tilt the fore end of support surface 30 up and the aft end of support surface 30 down relative to seat base 12 in response to seat base 12 experiencing a rearward acceleration (sometimes called a deceleration).

Controller 36 is configured to cause the plurality of actuators 34 to move seat bottom 18 to a defaults position relative to seat base 12 after acceleration of seat base 12 is removed. Controller 36 is configured to cause the plurality of actuators 34 to rotate seat bottom 18 so that the fore end rises and the aft end lowers in response to seat base 12 experiencing a forward acceleration. Controller 36 may be configured to cause the plurality of actuators 34 to rotate seat bottom 18 so that the fore end rises and the aft end lowers in response to seat base 12 experiencing a rearward acceleration.

In some embodiments, actuators 34 each include a worm gear and a motor located within a housing. The controller 36 is connected to the motor of each actuator 34 to actuate the worm gear according to the sensed acceleration by the system.

A method of using occupant support 10 includes a number of steps. In a first step, seat base 12 and seat 14 are provided. Seat 14 defines support surface 30 adapted to support the occupant thereon. In a second step, support surface 30 of seat 14 is moved relative to seat base 12 from a first position to a second position in response to an acceleration of seat base 12 during acceleration of seat base 12.

The second step may include translating support surface 30 relative to seat base 12. The second step may include tilting support surface 30 relative to seat base 12. The method may further include a third step of moving support surface 30 from the second position to the first position after the acceleration of seat base 12 is removed. Controller 36 is configured to make adjustments to means 16 manually by the occupant or automatically by a vehicle system as suggested in FIG. 7.

Figure 7:
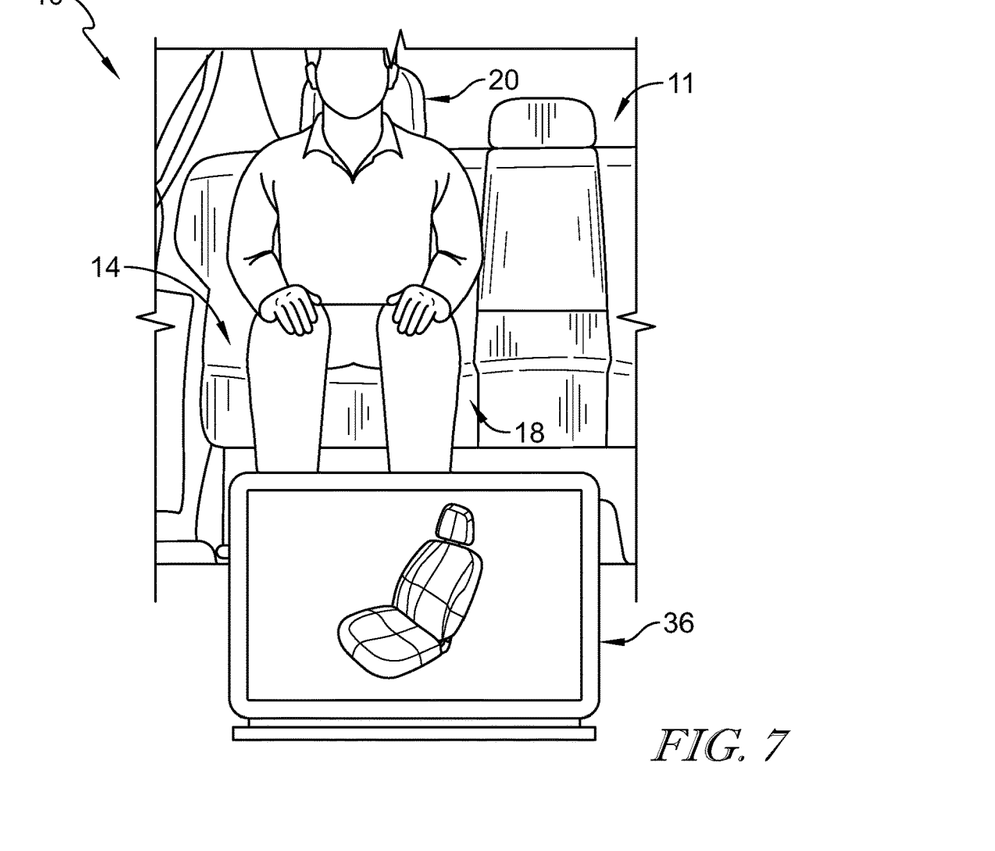
FIG. 7 is a diagrammatic view of the occupant support showing that the occupant support includes a controller configured to make adjustments manually by the occupant or automatically by a vehicle system by using the controller.
Figure 8:
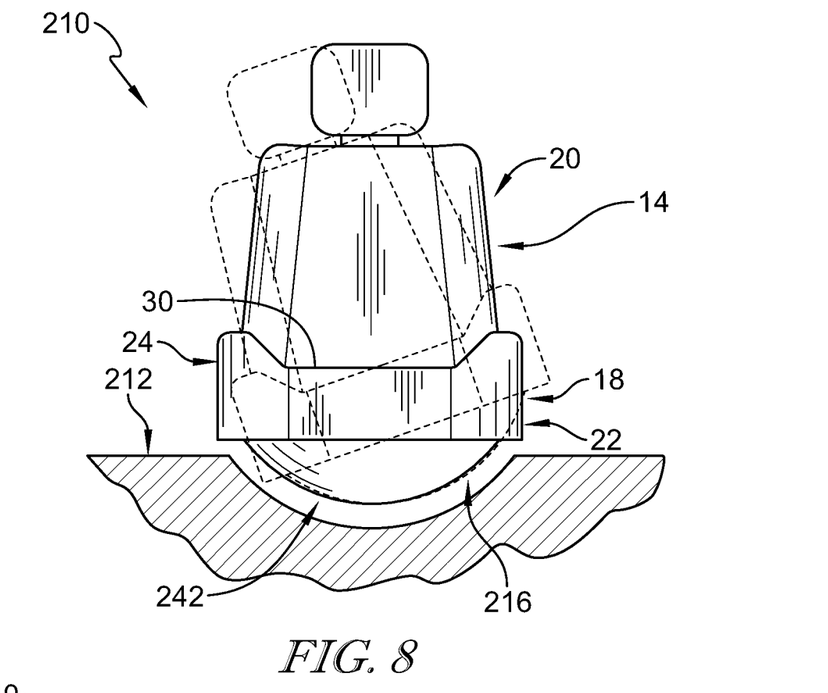
FIG. 8 is a diagrammatic view of another embodiment of an occupant support showing that the occupant support includes a seat, motion-sickness mitigation means, and a seat base wherein the motion-sickness mitigation means includes a rotatable seat mount configured to rotate the seat relative to the seat base in response to an acceleration of the seat base to minimize motion sickness of an occupant of the occupant support.

Another embodiment of an occupant support 210 is shown in FIG. 8. Occupant support 210 is substantially similar to occupant support 10 shown in FIGS. 1-7 and described herein. Accordingly, similar reference numbers in the 200 series indicate features that are common between occupant support 10 and occupant support 210. The description of occupant support 10 is incorporated by reference to apply to occupant support 210, except in instances when it conflicts with the specific description and the drawings of occupant support 210.

Occupant support 210 includes a seat base 212, seat 14, and motion-sickness mitigation means 216 as shown in FIG. 8. Motion-sickness mitigation means 216 includes motion-sickness mitigation system that includes a seat mount 242 coupled with seat bottom 18 for movement with seat bottom 18. Seat mount 242 is rotatably coupled with seat base 212 to allow seat bottom 18 to rotate relative to seat base 212. In the illustrative embodiment, seat mount 242 is passive and is free to move relative to seat base 212. In other embodiments, seat mount 242 is actively controlled and controller 36 is configured to control movement of seat mount 242 relative to seat base 212.

Figure 9:
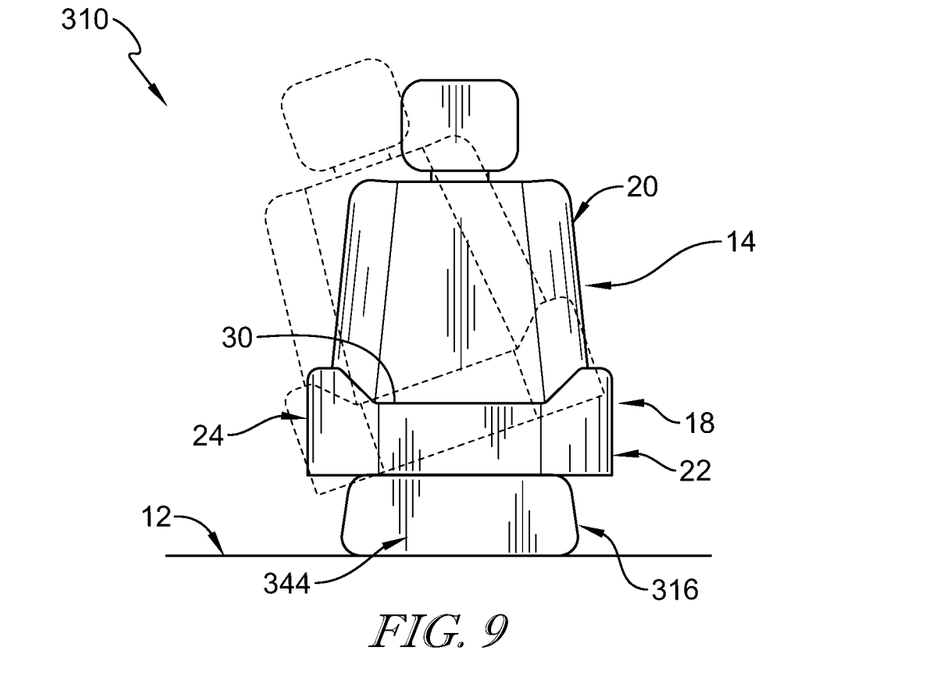
FIG. 9 is a diagrammatic view of another embodiment of an occupant support showing that the occupant support includes a seat, motion-sickness mitigation means, and a seat base wherein the motion-sickness mitigation means includes a bias member coupled with the seat and the seat base and configured to allow the seat to move relative to the seat base in response to an acceleration of the seat base to minimize motion sickness of an occupant of the occupant support.

Another embodiment of an occupant support 310 is shown in FIG. 9. Occupant support 310 is substantially similar to occupant support 10 shown in FIGS. 1-7 and described herein. Accordingly, similar reference numbers in the 300 series indicate features that are common between occupant support 10 and occupant support 310. The description of occupant support 10 is incorporated by reference to apply to occupant support 310, except in instances when it conflicts with the specific description and the drawings of occupant support 310.

Occupant support 310 includes seat base 12, seat 14, and motion-sickness mitigation means 316 as shown in FIG. 9. Motion-sickness mitigation means 316 includes a motion-sickness mitigation system that includes bias member 344 coupled with seat 14 and seat base 12. Bias member 344 is configured to deform in response to acceleration of seat base 12 to allow seat 14 to move relative to seat base 12 during acceleration of seat base 12. In the illustrative embodiment bias member 344 comprises a spring. In the illustrative embodiment, bias member 344 is passive and is free to move relative to seat base 12. In other embodiments, bias member 344 is actively controlled and controller 36 is configured to control movement of bias member 344 relative to seat base 12.

Figure 10:
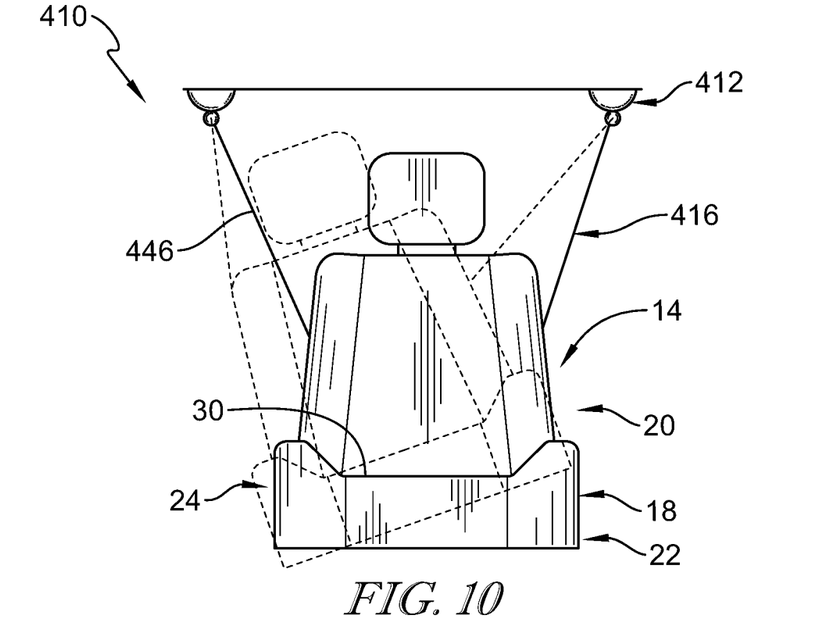
FIG. 10 is a diagrammatic view of another embodiment of an occupant support showing that the occupant support includes a seat, motion-sickness mitigation means, and a seat base wherein the motion-sickness mitigation means includes a strap coupled with the seat and the seat base to suspend the seat from the seat base to allow the seat to move relative to the seat base in response to an acceleration of the seat base to minimize motion sickness of an occupant of the occupant support.

Another embodiment of an occupant support 410 is shown in FIG. 10. Occupant support 410 is substantially similar to occupant support 10 shown in FIGS. 1-7 and described herein. Accordingly, similar reference numbers in the 400 series indicate features that are common between occupant support 10 and occupant support 410. The description of occupant support 10 is incorporated by reference to apply to occupant support 410, except in instances when it conflicts with the specific description and the drawings of occupant support 410.

Occupant support 410 includes seat base 412, seat 14, and motion-sickness mitigation means 416 as shown in FIG. 10. Seat base 412 is arranged above seat 14. Motion-sickness mitigation means 410 includes motion-sickness mitigation system that includes strap 446 coupled with seat 14 and seat base 412. Straps 446 are configured to suspend seat 14 from seat base 412 so that seat 14 is free to move relative to seat base 412. In other embodiments, straps 446 are actively controlled and controller 36 is configured to control movement of straps 446 relative to seat base 412.

Figure 11:
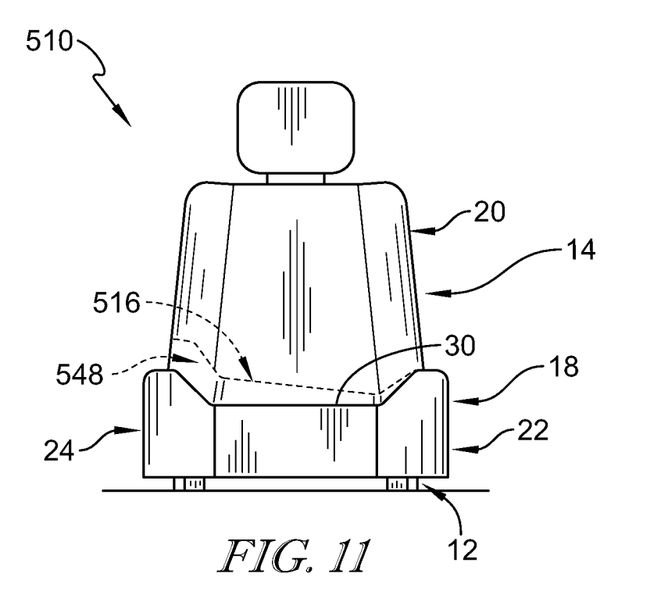
FIG. 11 is a diagrammatic view of another embodiment of an occupant support showing that the occupant support includes a seat, motion-sickness mitigation means, and a seat base wherein the motion-sickness mitigation means includes an adjustable seat cushion configured to move the seat relative to the seat base in response to an acceleration of the seat base to minimize motion sickness of an occupant of the occupant support.

Another embodiment of an occupant support 510 is shown in FIG. 11. Occupant support 510 is substantially similar to occupant support 10 shown in FIGS. 1-7 and described herein. Accordingly, similar reference numbers in the 500 series indicate features that are common between occupant support 10 and occupant support 510. The description of occupant support 10 is incorporated by reference to apply to occupant support 510, except in instances when it conflicts with the specific description and the drawings of occupant support 510.

Occupant support 510 includes seat base 12, seat 14, and motion-sickness mitigation means 516 as shown in FIG. 11. Motion-sickness mitigation means 510 includes motion-sickness mitigation system that includes an adjustable seat cushion 548 coupled to seat bottom 14. Adjustable seat cushion 548 is configured to move support surface 30 of seat 14 relative to the seat base 12. In one example, adjustable seat cushion 548 is configured to raise and lower a first lateral side of seat bottom 18 relative to a second lateral side of seat bottom 18.

In illustrative embodiments, a motion-sickness mitigation system 32 may be used with a vehicle seat 14 to minimize motion sickness experienced by an occupant resting on the vehicle seat 14. The motion-sickness mitigation system 32 may include one or more gravity dampers (or G dampers). FIG. 4 is a diagrammatic view showing a body of an occupant counterbalances within a vehicle moving in the opposite direction. FIG. 5 is a diagrammatic view showing inertial force experienced by an occupant that is accelerating in an occupant support 10. FIGS. 6-10 show a series of diagrammatic views showing different aspects of G damper mechanisms that may be used alone or in combination with one another.

Motion sickness is a condition which may include a number of associated symptoms. The rise of autonomous vehicles may lead to an increase in the number of occupants that experience motion sickness. Many activities unrelated to driving may have a worsening effect on the frequency and severity of motion sickness symptoms. For example, motion sickness may occur when attempting to read or watch screen content while moving. It is desired to address motion sickness and minimize or eliminate the effects of its symptoms.

Various symptoms of motion sickness that may be alleviated by one or more embodiments of the present disclosure include cold sweating, increased salivation, pallor (skin color), drowsiness, headache, severe pain, nausea, vomiting, and sopite syndrome (which includes profound drowsiness and persistent fatigue which may result in hours or days of boredom, apathy, increased irritability, and personality changes). The symptoms mentioned above may have a response dependent upon the provocativeness of stimulation, relative susceptibility of the person, and prior experiences.

Results from motion sickness field testing show an abrupt duration of less than two seconds in changes of x-G forces and y-G forces. G force loading was less than 1 G in each axis with rapid combined x-G forces and y-G forces provoking motion sickness within two seconds. Each test subject experienced high motion sickness for about half of the testing time and each subject noted that they would not have continued reading as long as they did during the test. An S-curve including slight rolling hills through a dark tunnel provoked motion sickness in some cases. Test subjects experienced some level of residual motion sickness symptoms following testing.

The present disclosure provides systems to mitigate or eliminate motion sickness by reducing the effects of acceleration or deceleration and reducing or controlling vehicle vibration levels either within the vehicle suspension or within the seating system. A gravity damper (or G damper) system may provide partial car motion cancellation relative to the occupant, may absorb inertial forces to provide a constant state to the body of occupant, and may reduce or override uncomfortable vibrations that may result in motion sickness.

Figure 6:
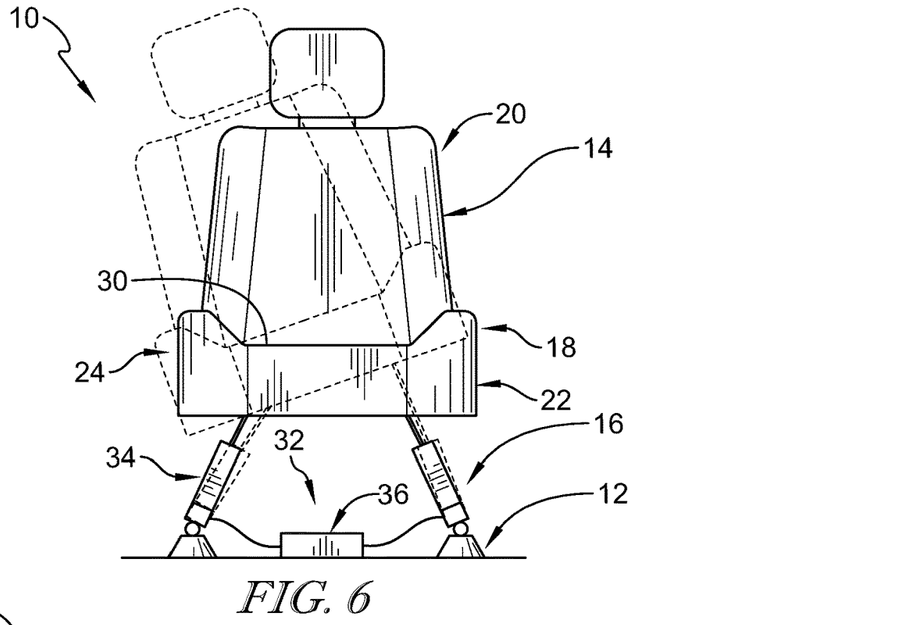
FIG. 6 is a diagrammatic view of the occupant support of FIG. 1 showing that the motion-sickness mitigation means includes a plurality of actuators configured to tilt and translate the seat relative to the seat base in response to an acceleration of the seat base.

FIG. 6 depicts an embodiment of a G damper with pistons or air springs. FIG. 8 depicts an embodiment of a G damper with a swaying or rotating base. FIG. 11 depicts an embodiment of a G damper with an adjustable seat cushion, which may include a connected sensor and controller to automatically adjust seat cushion angles. FIG. 7 depicts an embodiment of a G damper with a tablet or other object associated with the seating position. For example, micro-adjustments may be made manually by the occupant or automatically by the system by using connected sensors and a controller. FIG. 9 depicts an embodiment of a G damper with a vehicle seat spring. FIG. 10 depicts an embodiment of a G damper with vehicle seat straps. Vehicle seat straps may be made from a variety of material, including but not limited to rope, rubber, wire, chains, or any other material capable of holding or securing objects to one another.

Anyone may be vulnerable to the effects of motion sickness. It may occur even for blind people that experience visual or other sensory-dependent adaptation to the moving environment. Although complex interactions may not be fully understood because there are significant individual variations, there may be vestibular inputs and visceral inputs due to motion, and there may be a relationship between the head and the corresponding torso movements of a person. The sensory conflict theory provides that motion sickness may be caused by a discrepancy between the expected and actual sensory feedback. The sensory conflict theory may be the most widely-accepted theory and differentiates between somatic (muscles and joints) and visceral (gut) receptors which may act as biological accelerometers.

In some embodiments, at least one motion sickness mitigation means includes a motor with worm gear, air spring, etc. The motion sickness mitigation means may be set up in 2 pairs opposite one another along the perimeter at the seat base. A sensor system may be adapted to connect to a vehicle kinematics system for receipt of vehicle kinematics data. An electronic means may be adapted to connect the sensor system to the vehicle floor and to transfer the data to and from a controller. The controller may be adapted to connect to the sensor system for selective gravitational dampening of the vehicle floor based on data received by the sensor system.

Motion-sickness mitigation means are based on the Newton Laws of Motion. When a force is applied on a freely moving object in order to accelerate, decelerate, or change its direction, an equal inertial force acts on the object in an opposite direction of the applied force. An occupant can experience or feel that inertial force, which is an indicator of motion for their vestibular system.

The inertial force is proportional to the acceleration, so reducing the acceleration decreases the inertia force. Decoupling the occupant support from the rest of the vehicle, may allow it to freely move in the opposite direction of the vehicle acceleration, thus reducing the acceleration sustained by the occupant body and as a result the inertial force and the perception of motion. Following this principle, this disclosure may enable the occupant support to have a certain degree of free motion relatively to the vehicle frame, to enable it to move in the opposite direction of the vehicle acceleration.

This degree of free motion may be controlled via some dampening solution, to avoid an abrupt stop when reaching the limit of the free motion. The direction of free motion may also be controlled to maximize the occupant stability during the movement. Enabling the occupant body to describe the trajectory of a pendulum may create a centrifugal force (perpendicular to the inertial force), promoting stability.

The invention claimed is:

1. An occupant support for use in a vehicle, the occupant support comprising
   a seat base adapted to couple with the vehicle for movement with the vehicle,
   a seat coupled with the seat base for movement with the seat base, the seat including a seat bottom and a seat back, the seat bottom having a first lateral side, a second lateral side spaced apart from the first lateral side, a fore end, and an aft end spaced apart from the fore end, the seat back arranged to extend upwardly and away from the aft end of the seat bottom, and the seat bottom and seat back cooperate to define a support surface adapted to support an occupant of the occupant support thereon, and
   motion-sickness mitigation means for facilitating relative movement between the support surface of the seat and the seat base in response to an acceleration acting on the seat base to reduce at least one of lateral acceleration and fore-and-aft acceleration of the occupant during acceleration of the seat base so that motion sickness experienced by the occupant is minimized.

2. The occupant support of claim 1, wherein the motion-sickness mitigation means includes a plurality of actuators and a controller, the plurality of actuators are coupled with the seat and the seat base, and the controller is configured to control movement of each of the plurality of actuators individually to cause the plurality of actuators to move the seat relative to the seat base.

3. The occupant support of claim 2, wherein the plurality of actuators are configured to translate and tilt the seat bottom relative to the seat base.

4. The occupant support of claim 3, wherein the first lateral side of the seat bottom is a left lateral side, the second lateral side of the seat bottom is a right lateral side, and the controller is configured to cause the plurality of actuators to raise the left lateral side and lower the right lateral side of the seat bottom in response to the seat base experiencing a right turn.

5. The occupant support of claim 1, wherein the motion-sickness mitigation means includes a seat mount coupled with the seat bottom for movement with the seat bottom and rotatably coupled with the seat base to allow the seat bottom to rotate relative to the seat base.

6. The occupant support of claim 1, wherein the motion-sickness mitigation means includes a bias member coupled with the seat and the seat base and the bias member is configured to deform in response to the acceleration of the seat base to allow the seat to move relative to the seat base during acceleration of the seat base.

7. The occupant support of claim 1, wherein the motion-sickness mitigation means includes a strap coupled with the seat and the seat base and the strap is configured to suspend the seat from the seat base.

8. The occupant support of claim 1, wherein the motion-sickness mitigation means includes a worm gear.

9. An occupant support for use in a vehicle, the occupant support comprising
a seat base adapted to couple with the vehicle for movement with the vehicle,
a seat coupled with the seat base for movement with the seat base, the seat including a seat bottom and a seat back, the seat bottom having a first lateral side, a second lateral side spaced apart from the first lateral side, a fore end, and an aft end spaced apart from the fore end, the seat back arranged to extend upwardly and away from the aft end of the seat bottom, and the seat bottom and seat back cooperate to define a support surface adapted to support an occupant of the occupant support thereon, and
motion-sickness mitigation means for facilitating relative movement between the support surface of the seat and the seat base in response to an acceleration acting on the seat base to reduce at least one of lateral acceleration and fore-and-aft acceleration of the occupant during acceleration of the seat base so that motion sickness experienced by the occupant is minimized,
wherein the motion-sickness mitigation means includes an adjustable seat cushion coupled to the seat bottom and the adjustable seat cushion is configured to move the support surface of the seat relative to the seat base.

10. The occupant support of claim 9, wherein the adjustable seat cushion is configured to raise and lower the first lateral side of the seat bottom relative to the second lateral side of the seat bottom.

11. An occupant support comprising
a seat base,
a seat coupled with the seat base for movement with the seat base, and
a motion-sickness mitigation system configured to at least one of translate and tilt the seat relative to the seat base in response to an acceleration of the seat base,
wherein a controller is configured to translate the seat bottom in an aft direction in response to the seat experiencing forward acceleration.

12. The occupant support of claim 11, wherein the seat bottom has a first lateral side, a second lateral side spaced apart from the first lateral side, a fore end, and an aft end spaced apart from the fore end, the seat back is arranged to extend upwardly and away from the aft end of the seat bottom, and the motion-sickness mitigation system is configured to translate and tilt the seat bottom laterally and fore-and-aft relative to the seat base.

13. The occupant support of claim 12, wherein the motion-sickness mitigation system includes a plurality of actuators, the plurality of actuators are coupled with the seat and the seat base, and the controller is configured to control movement of each of the plurality of actuators individually to cause the plurality of actuators to move the seat relative to the seat base.

14. The occupant support of claim 13, wherein the first lateral side of the seat bottom is a left lateral side, the second lateral side of the seat bottom is a right lateral side, and the controller is configured to cause the plurality of actuators to raise the left lateral side and lower the right lateral side of the seat bottom in response to the seat base experiencing a right turn.

15. The occupant support of claim 11, wherein the seat includes a seat bottom and a seat back, the seat bottom and seat back cooperate to define a support surface adapted to support an occupant of the occupant support thereon, and the motion-sickness mitigation system includes an adjustable seat cushion included in the seat bottom, and the adjustable seat cushion is configured to move the support surface of the seat relative to the seat base.

16. A method comprising
providing a seat base and a seat that defines a support surface adapted to support an occupant thereon, and
moving the support surface of the seat relative to the seat base from a first position to a second position in response to an acceleration of the seat base during acceleration of the seat base
wherein the moving step includes translating the support surface relative to the seat base.

17. The method of claim 16, wherein the moving step includes tilting the support surface relative to the seat base.

18. The method of claim 16, further comprising moving the support surface from the second position to the first position after the acceleration of the seat base is removed.

* * * * *